United States Patent
Hotaka et al.

(10) Patent No.: US 7,191,811 B2
(45) Date of Patent: Mar. 20, 2007

(54) TIRE-WHEEL ASSEMBLY

(75) Inventors: Takeshi Hotaka, Hiratsuka (JP);
Yasuhiro Ishikawa, Hiratsuka (JP);
Osamu Ozawa, Hiratsuka (JP);
Ryotaro Suefuji, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 10/489,247

(22) PCT Filed: Aug. 8, 2003

(86) PCT No.: PCT/JP03/10134

§ 371 (c)(1),
(2), (4) Date: Mar. 11, 2004

(87) PCT Pub. No.: WO2004/016452

PCT Pub. Date: Feb. 26, 2004

(65) Prior Publication Data

US 2004/0244897 A1    Dec. 9, 2004

(30) Foreign Application Priority Data

Aug. 12, 2002  (JP)  ............................. 2002-234956
Aug. 12, 2002  (JP)  ............................. 2002-234963

(51) Int. Cl.
*B60C 17/02*  (2006.01)
*B60C 7/24*  (2006.01)

(52) U.S. Cl. ...................... 152/520; 152/400

(58) Field of Classification Search ................ 152/156, 152/158, 399–400, 516, 520

See application file for complete search history.

(56) References Cited

U.S. PATENT DOCUMENTS

| | | | |
|---|---|---|---|
| 5,173,341 A * | 12/1992 | Shiratori et al. | 427/434.6 |
| 5,288,446 A * | 2/1994 | Noyama et al. | 264/108 |
| 5,408,007 A * | 4/1995 | Mizuno et al. | 525/305 |
| 6,268,417 B1 * | 7/2001 | Ozawa et al. | 524/100 |
| 6,445,567 B1 * | 9/2002 | Komatsuki et al. | 361/518 |

(Continued)

FOREIGN PATENT DOCUMENTS

JP    02-298284 A1    12/1990

(Continued)

OTHER PUBLICATIONS

International Search Report for PCT/JP03/10134 mailed on Nov. 25, 2003.

*Primary Examiner*—Jason R. Bellinger
(74) *Attorney, Agent, or Firm*—Rader, Fishman & Grauer PLLC

(57) ABSTRACT

A run-flat tire-wheel assembly having, in an inside cavity of the tire/rim, a run-flat support formed by a ring-shaped metal shell and rubber elastic members or a ring-shaped metal shell and rubber elastic members composed of a rubber composition containing 100 parts by weight of a peroxide cross-linkable rubber and 1 to 30 parts by weight of a peroxide cross-linking agent, wherein the contact surfaces of the ring-shaped metal shell with the rubber elastic members are subjected to an electrolytic polymerization with 6-mono- or di-allylamino-1,3,5-triazine-2,4-dithiol or its mono- or di-salt, whereby the bondability between the ring-shaped metal shell and rubber elastic members is improved.

10 Claims, 2 Drawing Sheets

U.S. PATENT DOCUMENTS

| | | | |
|---|---|---|---|
| 6,463,976 B1 * | 10/2002 | Glinz et al. | 152/520 |
| 6,843,288 B2 * | 1/2005 | Seko et al. | 152/156 |
| 6,932,130 B2 * | 8/2005 | Hotaka et al. | 152/156 |
| 2004/0231773 A1 * | 11/2004 | Hotaka et al. | 152/156 |

FOREIGN PATENT DOCUMENTS

| | | |
|---|---|---|
| JP | 07-010939 A1 | 1/1995 |
| JP | 07-117167 A1 | 5/1995 |
| JP | 07-157596 A1 | 6/1995 |
| JP | 10-297226 A1 | 11/1998 |
| JP | 11-189009 A1 | 7/1999 |
| JP | 2001-519279 A1 | 10/2001 |
| WO | WO-99/19158 A1 | 4/1999 |
| WO | WO-99/64260 A1 | 12/1999 |

* cited by examiner

TIRE-WHEEL ASSEMBLY

TECHNICAL FIELD

The present invention relates to a tire-wheel assembly usable for a pneumatic tire which can be run on in a limited fashion in a damaged or deflated state (hereinafter referred to as a "run-flat tire"), more particularly relates to a tire-wheel assembly improved in bondability of the contact parts of the ring-shaped metal shell and the rubber elastic members of a run-flat support composed of a ring-shaped metal shell and rubber elastic members provided at a tire/rim inside cavity.

BACKGROUND ART

There is a need for a run-flat pneumatic tire having an emergency running capability enabling it to be run on for a certain distance even when the tire rapidly falls in inside pressure due to a puncture, bursting, etc. during the running of an automobile etc. As such a proposal, for example, Japanese Unexamined Patent Publication (Kokai) No. 10-297226 and Japanese PCT National Publication (Tokuhyo) No. 2001-519279 propose technology for attaching a run-flat support (or an insert) on the rims of the inside cavity of a pneumatic tire, which is usable to support a punctured or otherwise damaged pneumatic tire, whereby the run-flat running is possible.

The above run-flat support has a ring-shaped member having an outer circumference used as the support surface. Elastic rings are attached to the two legs thereof so that the support is supported on the rims through the elastic rings. The technology for using this run-flat support does not make any special modifications to the wheel/rims of conventional general pneumatic tires and enables the wheel/rims to be used as they are, and therefore has the advantage of enabling the production, processing, and mounting facilities of conventional pneumatic tires to be utilized as they are.

On the other hand, as an existing method, there is technology reinforcing the sidewalls of tires to enable run-flat running, but this has the problem that sufficient performance cannot be exhibited in tire sizes having large tire sectional heights. Further, as technology for providing a run-flat support at the inside cavity of a tire as explained above, there is one making the insert solid, but this has the problem that, since the insert does not have flexibility, the assembling thereof is difficult. Further, there are also proposals for use of special rim structures or special tire structures, but these have the problems that neither the tires nor the wheels have general usability, and therefore an excessive burden is provided on the user.

On the other hand, the technology using a run-flat support is superior in general usability and assembly, but the bonding strength of the contact surfaces of the elastic rings with the ring-shaped member has a large effect on the durability of the run-flat support and greatly governs the durability thereof. Therefore, to improve the durability of the run-flat support in a tire/wheel assembly having a run-flat support and to increase the run-flat distance, it is necessary to improve the bondability of the metal shell surface with the rubber elastic members of the support and the durability thereof.

DISCLOSURE OF INVENTION

Accordingly, the object of the present invention is to improve the bondability between a ring-shaped metal shell and the rubber elastic members forming a run-flat support of a run-flat tire-wheel assembly, whereby the durability of the run-flat support and the run-flat performance are improved.

In accordance with the present invention, there is provided a run-flat tire-wheel assembly having a run-flat support formed by a ring-shaped metal shell and rubber elastic members in a tire/rim inside cavity, wherein the contact surfaces of the ring-shaped metal shell with the rubber elastic members are subjected to an electrolytic polymerization by 6-mono- or di-allylamino-1,3,5-triazine-2,4-dithiol or its mono- or di-salt, whereby the bondability between the ring-shaped metal shell and rubber elastic members is improved.

In accordance with the present invention, there is also provided a run-flat tire-wheel assembly having a run-flat support formed by a ring-shaped metal shell and rubber elastic members composed of a rubber composition containing 100 parts by weight of a peroxide cross-linkable rubber and 1 to 30 parts by weight of a peroxide cross-linking agent in a tire/rim inside cavity, wherein the contact surfaces of the ring-shaped metal shell with the rubber elastic members are subjected to an electrolytic polymerization with 6-mono- or di-allylamino-1,3,5-triazine-2,4-dithiol or its mono- or di-salt, whereby the bondability between the ring-shaped metal shell and the rubber elastic members is improved.

MODE FOR CARRYING OUT THE INVENTION

According to the present invention, there is given a tire-wheel assembly having a run-flat support formed by a high rigidity metal shell and rubber elastic members and having the contact surfaces of the metal shell with the rubber elastic members treated by an electrolytic polymerization by 6-mono- or di-allylamino-1,3,5-triazine-2,4-dithiol or its mono- or di-salt (hereinafter sometimes simply referred to as a "triazine thiol derivative") so that the bondability between the ring-shaped metal shell and the rubber elastic members is improved. More preferably, by securing a predetermined bonding area, it is possible to impart, to the run-flat support, a bonding strength sufficient to withstand the load at the time of rim assembling or the time of run-flat running.

According to the present invention, there is further given a tire-wheel assembly having a run-flat support formed by a high rigidity metal shell and rubber elastic members composed of a rubber composition containing 100 parts by weight of a peroxide cross-linkable rubber and 1 to 30 parts by weight of a peroxide cross-linking agent and having the surface of the metal shell treated by an electrolytic polymerization with 6-mono- or di-allylamino-1,3,5-triazine-2, 4-dithiol or its mono- or di-salt (hereinafter sometimes simply referred to as a "triazine thiol derivative") so that the bondability between the ring-shaped metal shell and the rubber elastic members is improved. More preferably, by securing a predetermined bonding area, it is possible to impart, to the run-flat support, a bonding strength sufficient to withstand the load at the time of rim assembly or the time of run-flat performance.

The present invention will now be explained in more detail by the embodiments shown in the Figures.

Figure 1:
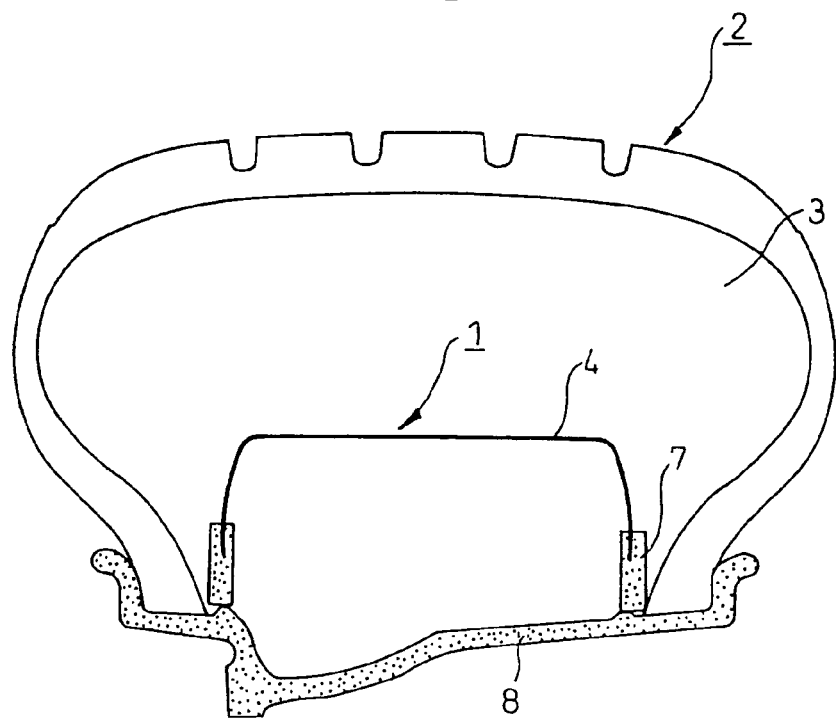
FIG. 1 is a sectional view in the meridial direction of principal parts of an embodiment of the tire-wheel assembly according to the present invention.
Figure 2:
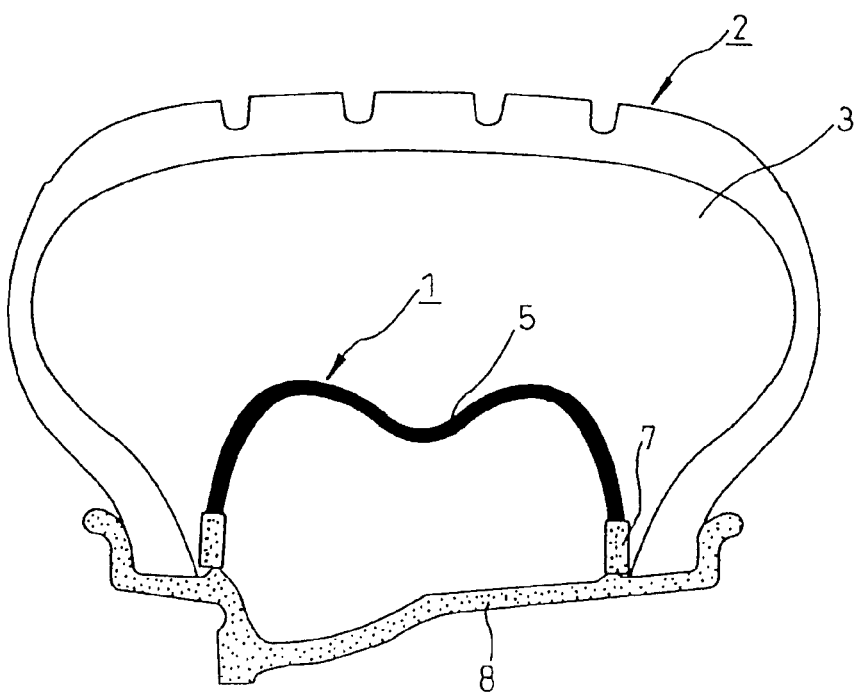
FIG. 2 is a sectional view in the meridial direction of principal parts of another embodiment of the tire-wheel assembly according to the present invention.
Figure 3:
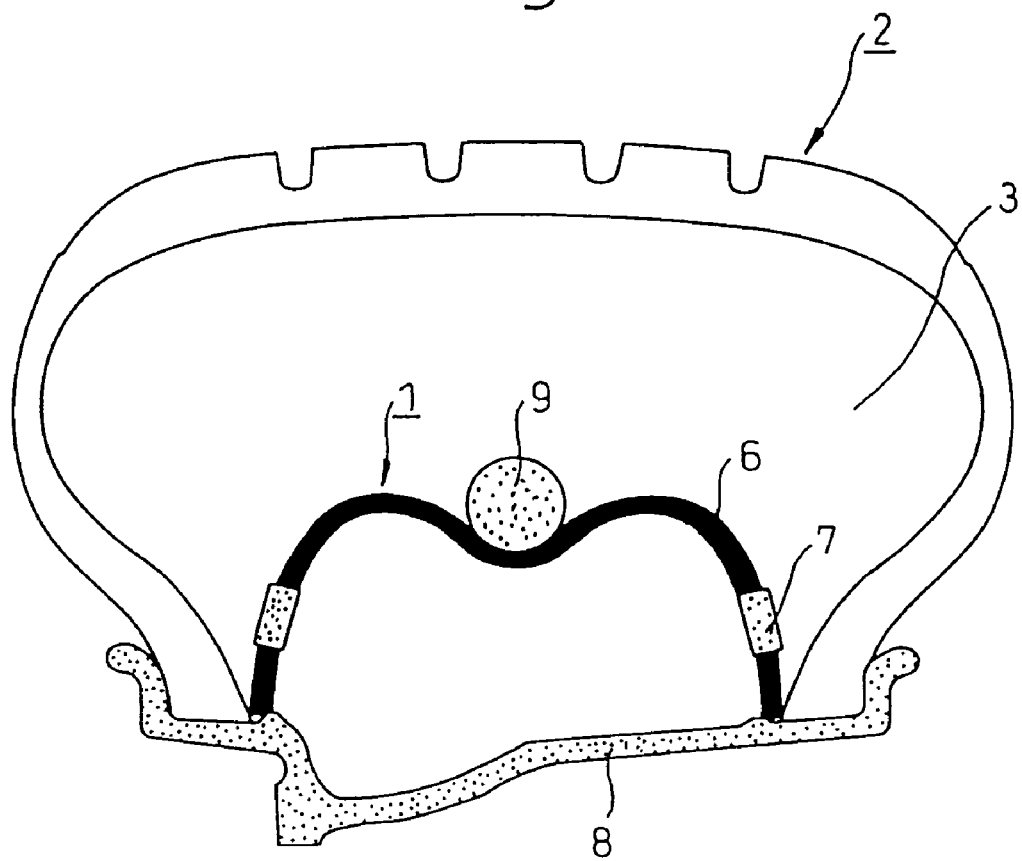
FIG. 3 is a sectional view in the meridial direction of principal parts of a further embodiment of the tire-wheel assembly according to the present invention.

FIG. 1, FIG. 2 and FIG. 3 are sectional views in the meridial direction showing principal parts of representative embodiments of the tire-wheel assembly (wheel) according to the present invention.

For example, as shown in FIG. 1, FIG. 2 and FIG. 3, the run-flat support 1 according to the present invention is formed from a ring-shaped metal shell 4, 5 or 6 inserted in a cavity 3 of a pneumatic tire 2 and rubber elastic members 7. This run-flat support 1 has an outside diameter formed smaller than the inside diameter of the cavity 3 so as to maintain a certain distance from the inside surface of the cavity 3 of the pneumatic tire 2 and has an inside diameter, which is formed to substantially the same dimension as the inside diameter of the bead part of the pneumatic tire. This run-flat support 1 is assembled into the rim 8 of the wheel together with the pneumatic tire 2 in the state inserted into the inside of the pneumatic tire 2, whereby the tire-wheel assembly is formed. When this tire-wheel assembly is attached to an automobile etc. and the pneumatic tire is punctured while running, the punctured and flattened tire 2 is supported at the outer circumference of the run-flat support 1, whereby flat run can be carried out.

As explained above, the run-flat support 1 of the tire-wheel assembly according to the present invention is composed of the ring-shaped metal shell 4, 5 or 6 and the rubber elastic members 7. The ring-shaped metal shell 4, 5 or 6 forms, at its outside, a continuous support surface for supporting a punctured or otherwise damaged tire and forms legs at its inside left and right side walls. The outside support surface can be made as various shapes, for example, the flat one such as shown in FIG. 1, one where the horizontal cross-section perpendicularly intersecting with the peripheral direction is formed with outwardly projecting curves such as shown in FIG. 2 (the number of the projecting curves in the tire axial direction not being limited to two as shown in FIG. 2 and also possibly being three or more or even single), or one composed of two or more projecting curves with an elastic spring 9 of a circular cross-section arranged in the recessed part as shown in FIG. 3 to impart a shock buffering capability at the time of run-flat running and/or having the ring-shaped metal shell separated by rubber elastic members, so that the side walls of the metal shell directly contact the rims and enable a stable engagement state to be maintained. Even when the support surface is formed in this way, if the bonding between the metal and the rubber elastic members is increased according to the present invention, it is possible to increase the sustained run-flat distance of the tire.

The rubber elastic members are attached to the ends of the two legs of the ring-shaped metal shell (see FIG. 1 or FIG. 2) or in the middles of the two legs (see FIG. 3) and support the ring-shaped metal shell by abutting against the left and right rims in that state. The rubber elastic members are composed of rubber, lighten the shock or vibration received by the ring-shaped metal shell from a punctured or otherwise damaged tire, and act to stop sliding with respect to the rims, whereby the ring-shaped metal shell are stably supported on the rims.

Figure 4:
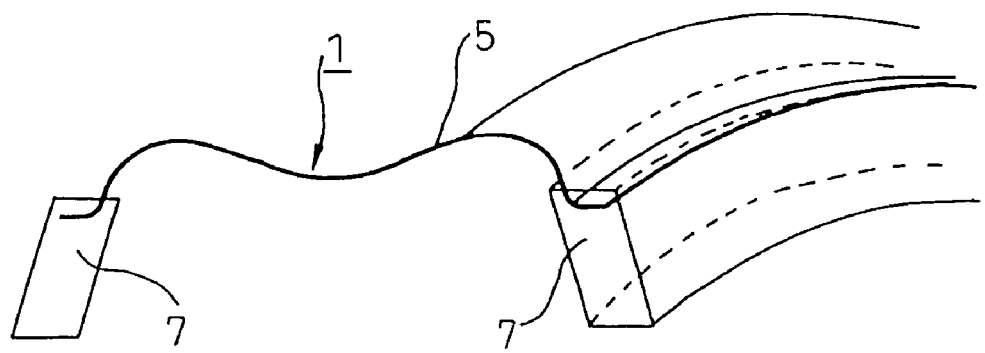
FIG. 4 is a view of an example of bonding surfaces between the metal shell and the rubber elastic members of the tire-wheel assembly according to the present invention.

As shown in FIG. 4, the ring-shaped metal shell 5 and the rubber elastic members 7 forming the run-flat support 1 have a strong bonding strength, but preferably should be capable of securing a predetermined bonding area. When the load at the time of rim assembling work or the run-flat running is made dimensionless according to the rim radius R (inch) and the contact area is S (cm²), the ratio S/R should be at least 4.5 cm²/inch, preferably 8 to 20 cm²/inch. Here, the "bonding area" means the bonding area between the metal and the rubber elastic member at one side of the ring-shaped metal shell, that is, the total bonding area once around in the peripheral direction at the front/rear surfaces and the end of the metal shell where the end of the ring-shaped metal shell contacts the rubber elastic member in the horizontal cross-section perpendicularly intersecting the peripheral direction.

Further, the contact surfaces or bonding surfaces between the ring-shaped metal shell 5 and the rubber elastic members 7 should be formed by the axial direction and radial direction. It is more preferable that the two be substantially equal. By this, a structure is formed which can withstand both forces in the axial direction and the radial direction occurring at the time of run-flat running.

In FIGS. 1, 2 and 3, the run-flat support 1, the pneumatic tire 2 and the rim 8 are formed in ring shapes coaxially about the wheel shaft (not shown). Note that the dimensions of the metal shell are not particularly limited, but preferably are a thickness of 0.5 to 3.0 mm and a width substantially equal to the interval between the left and right tire bead toes.

The tire-wheel assembly of the present invention supports the weight of the automobile etc. through the punctured or otherwise damaged tire, and therefore, the ring-shaped member 4, 5 or 6 is composed of a metal material. Examples of such a metal are iron, stainless steel, aluminum alloy, etc.

The rubber elastic members may be composed of any rubber so long as they can stably support the ring-shaped metal shell. Examples of such a rubber are, for example, natural rubber (NR), isoprene rubber (IR), various types of styrene-butadiene rubber (SBR), various types of polybutadiene rubber (BR), butyl rubber (IIR), various types of acrylonitrile-butadiene copolymer rubber (NBR), various types of ethylene-propylene copolymer rubber (EPDM), etc.

The rubber composition forming the rubber elastic members of the present invention may further contain an ordinary vulcanizer or cross-linking agent, vulcanization or cross-linking accelerator, various types of oils, an antiaging agent, a filler, a plasticizer, or various other types of additives generally compounded for rubber use. The amounts of these additives can also be made the amounts generally compounded in the past so long as this does not adversely affect the object of the present invention.

In the present invention, to improve the bondability of the ring-shaped metal shell 4, 5 or 6 with the rubber elastic members 7, the contact surfaces of the metal shell 4, 5 or 6 with the rubber elastic members are treated by an electrolytic polymerization. The triazine thiol derivatives usable for the electrolytic polymerization is expressed by the following formula (I) and preferably is a 6-mono- or di-allylamino-1, 3,5-triazine-2,4-dithiol or its mono- or di-salt:

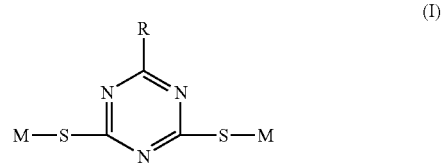

(I)

wherein R is —NHR¹ or —N(R¹)₂, where R¹ is an allyl group, M is H, Na, Li, K, ½ Ba, ½Ca, aliphatic primary, secondary and tertiary amines, a quaternary ammonium salt.

The electrochemical surface treatment of the metal shell surface performed in the present invention, for example, may use the technology described in Japanese Examined Patent Publication (Kokoku) No. 5-51671 (the content of which should be incorporated in the present description by the citation thereof). Specifically, it is possible to use an aqueous solution of the triazine thiol derivative of the above formula (I), or an organic solvent solution of the same using, as a solvent, an organic solvent such as methyl alcohol, isopropyl alcohol, ethyl alcohol, acetone, toluene, ethyl cellusolve, dimethyl formaldehyde, tetrahydrofuran, methylethylketone, benzene, ethyl acetate ether, as an electrodeposition solution, a metal is used as an anode and a platinum plate or titanium plate or carbon plate is used as a cathode, and to pass therethrough at 20V or less, preferably 0.5 to 1.5V, 0.01 to 10 A/dm$^2$, preferably 0.1 to 5.0 A/dm$^2$, of current at a temperature of 0 to 80° C., preferably 20 to 60° C., for 0.1 second to 30 minutes, preferably 5 minutes to 10 minutes.

As mentioned above, in the present invention, by treating the metal shell surface by an electrolytic polymerization, whereby a polymer of the triazine thiol derivative is deposited on the contact surfaces of the metal shell with the rubber elastic members, it is possible to bond the metal surface of the metal shell with the rubber surfaces of the rubber elastic members well with each other.

In the second aspect of the present invention, the rubber elastic members are composed of a rubber composition containing 100 parts by weight of a peroxide cross-linkable rubber and 1 to 30 parts by weight, preferably 2 to 10 parts by weight, of a peroxide cross-linking agent. As the peroxide cross-linkable rubber, an ethylene-vinyl acetate copolymer rubber (EVM), a silicone rubber (Q), a urethane rubber (U), a fluororubber (FKM), an acryl rubber (ACM), a chlorinated polyethylene rubber (CM), an acrylonitrile-butadiene copolymer rubber (NBR), a hydrogenated acrylonitrile-butadiene copolymer rubber (HNBR), etc. may be mentioned.

The peroxide cross-linking agent usable in the second aspect of the present invention is not particularly limited so long as it is generally used for cross-linking a rubber, but an organic peroxide where the cross-linking reaction will not overly proceed at the temperature during the processing in the rubber composition is preferable, a dialkylperoxide having a decomposition temperature (i.e., a temperature where half life becomes 10 hours) of at least 80° C.) is preferable, specifically dicumyl peroxide, di-t-butyl peroxide, 1,3-bis(t-butylperoxyisopropyl)benzene, n-butyl 4,4'-di(t-butylperoxy)valerate, and 2,5-dimethyl-2,5-di(t-butylperoxy)hexane may be mentioned. If the compounding amount of the peroxide cross-linking agent is too small, the desired effect of improvement of the bondability cannot be obtained, while conversely if too large, the cross-linked density becomes high, the elongation at break becomes lower and other breakage properties are impaired, and therefore these are not desirable.

EXAMPLES

The present invention will now be explained further by Examples, but needless to say the scope of the present invention is not limited to these Examples.

Examples 1 to 3 and Comparative Examples 1 to 4

The rubber elastic members having the formulations (parts by weight) and the substrates shown in Table I were used to show the advantageous effects of the present invention.

Triazine thiol derivative X or Y was dissolved in water to a concentration of 1% by weight and placed in an electrodeposition vessel (dimensions: girth 78 mmφ×height 103 mm). The treatment temperature was held at 20° C. A stainless steel substrate (i.e., thickness 0.1 mm, width 2.5 cm) was assembled into the apparatus in advance, and a constant voltage (0.7 to 1.0V) was applied, and the substrate was continuously treated in the electrodeposition vessel for 3 to 10 minutes. The amount of deposition of the triazine thiol derivative coating was 5 to 200 nm. Note that the substrate of Comparative Example 1 was not treated by the electrolytic polymerization.

Next, rubber elastic member samples (dimensions: 5.5 mm thickness×2.5 cm width×8 cm length) of the formulations (parts by weight) shown in Table I were prepared. Substrates treated by the electrolytic polymerization by the triazine thiol derivative were heated and bonded with the samples of the rubber elastic member at 160° C.×20 minutes. The results are shown in Table I.

TABLE I

| | Comp. Ex. 1 | Comp. Ex. 2 | Ex. 1 | Comp. Ex. 3 | Ex. 2 | Comp. Ex. 4 | Ex. 3 |
|---|---|---|---|---|---|---|---|
| Rubbery elastic member | | | | | | | |
| NIPOL 1042*1 | 100 | 100 | 100 | 100 | 100 | 100 | 100 |
| Asahi #60*2 | 70 | 70 | 70 | 70 | 70 | 70 | 70 |
| Zinc White No. 3*3 | 5 | 5 | 5 | 5 | 5 | 5 | 5 |
| Stearic acid*4 | 1 | 1 | 1 | 1 | 1 | 1 | 1 |
| FLECTOL TMQ*5 | 1 | 1 | 1 | 1 | 1 | 1 | 1 |
| Sulfur*6 | 2 | 2 | 2 | 2 | 2 | 2 | 2 |
| Noccelar CZ-G*7 | 2 | 2 | 2 | 2 | 2 | 2 | 2 |
| Substrate*8 | | | | | | | |
| Triazine thiol derivative*9 | A | B | B | C | C | D | D |
| | — | X | Y | X | Y | X | Y |
| Physical properties evaluated | | | | | | | |
| Peeling force*10 | 100 | 103 | 170 | 108 | 260 | 115 | 280 |
| Rubber coverage (%) *11 | 0 | 0 | 70 | 5 | 100 | 25 | 100 |

Footnotes of Table I
*1: NBR (nitrile content 33%) manufactured by Nippon Zeon.
*2: Carbon black (FEF Grade) (N$_2$SA: 41 m$^2$/g, DBP oil absorption: 121 ml/100 g) manufactured by Asahi Carbon.
*3: Zinc oxide manufactured by Seido Chemical Industry.
*4: Stearic acid manufactured by NOF Corporation.
*5: Antioxidant RD manufactured by Flexsys.
*6: Sulfur manufactured by Karuizawa Refinery.
*7: Vulcanization accelerator manufactured by Ouchi Shinko Chemical Industrial
*8: Substrate (made of stainless steel SUS304)
A: No electrolytic polymerization treatment
B: Electrolytic polymerization treatment 3 minutes
C: Electrolytic polymerization treatment 5 minutes
D: Electrolytic polymerization treatment 10 minutes
*9: Triazine thiol derivative
X: 6-dibutylamino-1,3,5-triazine-2,4-dithio monosodium salt
Y: 6-diallylamino-1,3,5-triazine-2,4-dithiol monosodium salt
*10: Measured based on the bonding test method for vulcanized rubber and thermoplastic rubber of JIS (i.e., Japanese Industrial Standards) K6256. Shown indexed to value of Comparative Example 1 as 100. The larger the value shown, the better the bondability.
*11: Shows rubber coverage on substrate surface after peeling, where no rubber coverage is indicated as 0% and complete rubber coverage is indicated as 100%.

As shown in Table I, the bondability between the substrate treated by electrodeposition of the triazine thiol derivative Y and the rubber elastic members featured a strong peeling force and an excellent rubber coverage on the substrate surface after peeling.

Examples 4 to 6 and Comparative Example 5

Tire-wheel assemblies of the present invention (Examples 4 to 6) and a conventional tire-wheel assembly based on Comparative Example 1 (Comparative Example 5) were prepared with a tire size of 205/55R16 89V and rim size of 16×6 ½JJ.

Further, for the run-flat support of the tire-wheel assemblies, the assembly shown in FIG. 2 was used.

These sample tire-wheel assemblies were tested to evaluate their durability by the measurement method shown below. The results are shown in Table II.

Durability Test

Test tires were attached to a 2500 cc passenger car, the air pressure in the front right tire was set to 0 kPa, the air pressure in the other three tires was set to 200 kPa and the car was run at 90 km/hr until the breakdown. The results are shown in Table II indexed to the value of Comparative Example 5 as 100. The larger the

TABLE II

|  | Comp. Ex. 5 | Examples | | |
|---|---|---|---|---|
|  |  | 4 | 5 | 6 |
| Durability | 100 | 110 | 115 | 118 |

Footnotes of Table II
Example 4: Bonding method of Example 1
Example 5: Bonding method of Example 2
Example 6: Bonding method of Example 3

From the results shown in Table II, it is cleared that the tire-wheel assembly of the present invention can improve the durability.

Examples 7 to 10 and Comparative Examples 6 to 9

The rubber elastic members of the formulations (parts by weight) shown in Table III were used to verify the advantageous effects of the present invention.

The triazine thiol derivative 6-diallylamino-1,3,5-triazine-2,4-dithiol monosodium salt was dissolved in water to a concentration of 1% by weight and placed in an electrodeposition vessel (dimensions: girth 78 mmϕ×height 103 mm). The treatment temperature was held at 20° C. A stainless steel substrate (thickness 0.1 mm, width 2.5 cm) was assembled into the apparatus in advance, a constant voltage (0.7 to 1.0V) was applied, and the substrate was continuously treated in the electrodeposition vessel for 10 minutes. The coated amount of deposition of the triazine thiol derivative was 100 nm.

Next, rubber elastic member samples (dimensions: 5.5 mm thickness×2.5 cm width×8 cm length) of the formulations (parts by weight) shown in Table III were prepared. Substrates treated by electrolytic polymerization by the triazine thiol derivative were heated and bonded with the samples at 160° C.×20 minutes. The results are shown in Table III.

TABLE III

|  | Comp. Ex. 6 | Ex. 7 | Comp. Ex. 7 | Ex. 8 | Comp. Ex. 8 | Ex. 9 | Comp. Ex. 9 | Ex. 10 |
|---|---|---|---|---|---|---|---|---|
| NIPOL 1042*1 | 100 | 100 | — | — | — | — | — | — |
| Hydrogenated NBR*2 | — | — | 100 | 100 | — | — | — | — |
| Daisolac N130S*3 | — | — | — | — | 100 | 100 | — | — |
| VITON E-45*4 | — | — | — | — | — | — | 100 | 100 |
| Asahi #60*5 | 70 | 70 | 70 | 70 | 70 | 70 | 70 | 70 |
| Zinc White No. 3*6 | 5 | 5 | 5 | 5 | 5 | 5 | 5 | 5 |
| Stearic acid*7 | 1 | 1 | 1 | 1 | 1 | 1 | 1 | 1 |
| FLECTOL TMQ*8 | 1 | 1 | 1 | 1 | 1 | 1 | 1 | 1 |
| Sulfur*9 | 2 | — | 2 | — | 2 | — | 2 | — |
| Noccelar CZ-G*10 | 2 | — | 2 | — | 2 | — | 2 | — |
| Parkadox 14/40*11 | — | 5 | — | 5 | — | 5 | — | 5 |
| Initial bonding |  |  |  |  |  |  |  |  |
| Peeling force | 100 | 200 | 100 | 260 | 100 | 188 | 100 | 220 |
| Rubber coverage (%) | 10 | 100 | 10 | 100 | 10 | 100 | 10 | 100 |
| Heat aged bonding (note) |  |  |  |  |  |  |  |  |
| Peeling force | 100 | 300 | 100 | 350 | 100 | 250 | 100 | 320 |
| Rubber coverage (%) | 0 | 50 | 0 | 70 | 0 | 30 | 0 | 60 |

(Note) The value in the heat aged bonding is the value after causing deterioration under conditions of 80° C. × 1 week
Footnotes of Table III
*1: NIPOL 1042: NBR (nitrile content 33%) manufactured by Nippon Zeon.
*2: Hydrogenated NBR: Hydrogenated NBR (Zetpal 2000L) manufactured by Nippon Zeon
*3: Daisolac N130S: Chlorinated polyethylene manufactured by Daiso
*4: VITON E-45: Fluororubber manufactured by Dupont Dow Elastomer Japan
*5: Asahi #60: Carbon black (FEF Grade) ($N_2SA$: 41 $m^2/g$, CBP oil absorption: 121 ml/100 g) manufactured by Asahi Carbon.
*6: Zinc White No. 3: Zinc oxide manufactured by Seido Chemical Industry.
*7: Stearic acid: Stearic acid manufactured by NOF Corporation.
*8: FLECTOL TMQ: Antioxidant manufactured by Flexsys.
*9: Sulfur: Sulfur manufactured by Karuizawa Refinery.
*10: Noccelar CZ-G: Vulcanization accelerator manufactured by Ouchi Shinko Chemical Industrial
*11: Parkadox 14/40: Peroxide manufactured by Kayaku Akzo The test methods for the physical properties evaluated were as follows:

Peeling force: Measured based on the bonding test method for vulcanized rubber and thermoplastic rubber of JIS K6256. Results shown indexed to values of Comparative Examples as 100. The larger the value shown, the better the bondability.

Rubber coverage (%): Shows rubber coverage on the substrate surface after peeling, where no rubber coverage is indicated as 0% and complete rubber coverage is indicated as 100%.

As shown in Table III, the substrates treated by the electrodeposition of the triazine thiol derivative exhibited excellent bondability both initially and after heat ageing.

Examples 11 to 14 and Comparative Example 10

Tire-wheel assemblies of the present invention (Examples 11 to 14) and a conventional tire-wheel assembly based on a Comparative Example (Comparative Example 10) were prepared with a tire size of 205/55R16 89v and rim size of 16×6 ½JJ.

Further, for the run-flat support of the tire-wheel assemblies, the assembly shown in FIG. 2 was used.

These test tire-wheel assemblies were tested to evaluate their durability by the measurement method shown below. The results are shown in Table IV.

Durability Test

Test tires were attached to 2500 cc passenger car, the air pressure in the front right tire was set to 0 kPa, the air pressure in the other three tires was set to 200 kPa, and the car was run at 90 km/hr until breakdown. The results are shown in Table IV indexed to the value of Comparative Example 10 as 100. The larger the figure shown, the better the durability.

TABLE IV

|  | Comp. | Examples | | | |
| --- | --- | --- | --- | --- | --- |
|  | Ex. 10 | 11 | 12 | 13 | 14 |
| Durability | 100 | 120 | 125 | 115 | 122 |

Footnotes of Table IV
Example 11: Bonding method of Example 7
Example 12: Bonding method of Example 8
Example 13: Bonding method of Example 9
Example 14: Bonding method of Example 10

From the results of Table IV, it is cleared that the tire-wheel assembly of the present invention can be improved in durability.

INDUSTRIAL APPLICABILITY

As explained above, the bonding with a metal such as iron, stainless steel which is poor in the bondability with rubber alone and a rubber elastic member is extremely difficult. Even if bonding were possible, the bond often would be insufficient strength-wise or the durability would be poor along with the elapse of time. Contrary to this, according to the present invention, as explained above, by plating this specific triazine thiol derivative by electrolytic polymerization treatment of the metal surface, it is possible to improve the surface of the metal so that the bondability with a rubber is improved, possible to greatly improve the bondability with rubber over that of metal alone, and possible to greatly improve the durability of the run-flat support. Further, according to the second aspect of the present invention, by plating a specific triazine thiol derivative by electrolytic polymerization treatment of the metal surface, it is possible to improve the surface of the metal-so that the bondability of the metal with the peroxide-cross-linkable rubber elastic members is improved. The triazine thiol derivative formed on the metal surface has allyl groups, and therefore enables the formation of a further stronger coating by making these three-dimensional. The allyl groups have a high reactivity with the peroxide compounded in the rubber and strengthen the bonding strength between the rubber and the treated coating, whereby the bondability between the rubber and the metal is greatly improved. Further, it is also possible to improve the aging resistance of the bonding interface due to external stimulus since the bondability with the treated coating is high.

The invention claimed is:

1. A run-flat tire-wheel assembly having a run-flat support formed by a ring-shaped metal shell and rubber elastic members in a tire/rim inside cavity,
wherein the contact surfaces of the ring-shaped metal shell with the rubber elastic members are subjected to an electrolytic polymerization treatment with 6-mono- or di-allylamino-1,3,5-triazine-2,4-dithiol or its mono- or di-salt, whereby the bondability between the ring-shaped metal shell and the rubber elastic members is improved.

2. A run-flat tire-wheel assembly as claimed in claim 1, wherein the rubber elastic members comprise a rubber composition including 100 parts by weight of a peroxide cross-linkable rubber and 1 to 30 parts by weight of a peroxide cross-linking agent in a tire/rim inside cavity, wherein the contact surfaces of the ring-shaped metal shell with the rubber elastic members are subjected to electrolytic polymerization with 6-mono- or di-allylamino-1,3,5-triazine-2,4-dithiol or its mono- or di-salt, whereby the bondability between the ring-shaped metal shell and the rubber elastic members is improved.

3. A tire-wheel assembly as claimed in claim 2, wherein said peroxide cross-linkable rubber is at least one rubber selected from the group consisting of an ethylene-vinyl acetate copolymer rubber, a silicone rubber, a urethane rubber, a fluororubber, an acryl rubber, a chlorinated polyethylene rubber, and acrylonitrile-butadiene copolymer rubber and a hydrogenated acrylonitrile-butadiene copolymer rubber.

4. A tire-wheel assembly as claimed in claim 2 or 3, wherein said peroxide cross-linking agent is at least one agent selected from dicumyl peroxide, di-t-butyl peroxide, 1,3-bis(t-butylperoxyisopropyl)benzene, n-butyl 4,4'-di(t-butylperoxy)valerate and 2,5-dimethyl-2,5-di(t-butylperoxy)hexane.

5. A tire-wheel assembly as claimed in claim 1, wherein the rubber elastic members of said run-flat support are arranged between the ring-shaped metal shell and the rim and are structured to be able to support the ring-shaped metal shell.

6. A tire-wheel assembly as claimed in claim 1, wherein, when a nominal radius of the tire is R (inch) and a bonding area of the rubber elastic members with metal is S ($cm^2$), the ratio S/R is 4.5 $cm^2$/inch or more.

7. A tire-wheel assembly as claimed in claim 1, wherein said bonding surface is composed by a substantially axial direction surface and substantially radial direction surface.

8. A tire-wheel assembly as claimed in claim 2, wherein said peroxide cross-linking agent is a dialkyl peroxide having a decomposition temperature of at least 80° C.

9. A run-flat support formed by a ring-shaped metal shell and rubber elastic members, wherein the contact surfaces of the ring-shaped metal shell with the rubber elastic members are subjected to an electrolytic polymerization with 6-mono- or di-allylamino-1,3,5-triazine-2,4-dithiol or its mono- or di-salt, whereby the bondability between the rubber elastic members and the ring-shaped metal shell is improved.

10. A run-flat support formed by a ring-shaped metal shell and rubber elastic members, wherein the contact surfaces of the ring-shaped metal shell with the rubber elastic members are subjected to an electrolytic polymerization by 6-mono- or di-allylamino-1,3,5-triazine-2,4-dithiol or its mono- or di-salt, whereby the bondability between rubber elastic members composed of a rubber composition containing 100 parts by weight of a peroxide cross-linkable rubber and 1 to 30 parts by weight of a peroxide cross-linking agent and the ring-shaped metal shell is improved.

\* \* \* \* \*